(12) United States Patent
Costin

(10) Patent No.: US 7,143,314 B2
(45) Date of Patent: Nov. 28, 2006

(54) METHOD AND APPARATUS FOR ENSURING INTEGRITY OF CRITICAL RAM VARIABLES

(75) Inventor: Mark H. Costin, Bloomfield Township, MI (US)

(73) Assignee: General Motors Corporation, Detroit, MI (US)

( * ) Notice: Subject to any disclaimer, the term of this patent is extended or adjusted under 35 U.S.C. 154(b) by 486 days.

(21) Appl. No.: 10/676,528

(22) Filed: Oct. 1, 2003

(65) Prior Publication Data
US 2005/0076266 A1 Apr. 7, 2005

(51) Int. Cl.
*G06F 11/00* (2006.01)
(52) U.S. Cl. ........................................ 714/38
(58) Field of Classification Search .................. 714/38, 714/37, 42, 39; 717/124, 133, 126
See application file for complete search history.

(56) References Cited

U.S. PATENT DOCUMENTS

| 5,613,079 A | 3/1997 | Debique et al. ............. 395/468 |
| 6,314,532 B1 * | 11/2001 | Daudelin et al. ............. 714/38 |
| 6,347,396 B1 * | 2/2002 | Gard et al. .................. 717/168 |
| 6,950,863 B1 * | 9/2005 | Pham et al. ................. 709/221 |
| 2004/0123272 A1 * | 6/2004 | Bailey et al. ............... 717/125 |

\* cited by examiner

*Primary Examiner*—Nadeem Iqbal
(74) *Attorney, Agent, or Firm*—Christopher DeVries

(57) ABSTRACT

Methods and apparatus are provided for ensuring the integrity of a software variable stored in memory. The method comprises the steps of verifying the integrity of the specific hardware to be used in calculating and storing software variables, calculating a software variable and a dual store software variable using the verified hardware, storing both software variables in verified memory, and comparing the two stored software variables to verify the integrity of the software used for calculating and storing the two software variables.

20 Claims, 4 Drawing Sheets

METHOD AND APPARATUS FOR ENSURING INTEGRITY OF CRITICAL RAM VARIABLES

TECHNICAL FIELD

The present invention generally relates to software variables stored in a memory, and more particularly relates to ensuring the integrity of critical software variables stored in a memory.

BACKGROUND

Software variables are logical constructs used by computers for processing and storing information. Software variables are typically calculated by a system processor and are generally stored in a memory for subsequent use in program execution. The software variable calculation may be as simple as a copy from a Read Only Memory (ROM) or a Random Access Memory (RAM) location, or may involve a complex manipulation by the system processor. Typically, the system processor is coupled to an Arithmetic Logic Unit (ALU), which is generally responsible for the manipulation of data stored in the memory registers, and for the loading and storage of data to and from these registers. Processors also generally contain a number of registers that are special memory locations, and can be manipulated directly by the ALU.

The type of memory used for storing software variables is generally a random access memory (RAM), typically coupled to the processor via a bus or other connection. Stored software variables may be utilized in a wide range of process control applications. Where the implementation of a software variable can be a factor in the proper functioning of a control process, the integrity of the software variable becomes an important operational consideration. Therefore, the designation "critical software variable" is often used to denote the type of software variable that may significantly affect the desired performance of a particular process.

For example, an automotive throttle control system may use critical software variables in a process that regulates the functioning of the throttle relative to the position of the accelerator pedal. Other exemplary automotive processes that might use critical software variables include fuel injection control systems, automatic braking systems and air bag control systems. In addition, there are many non-automotive applications where critical software variables could be used, such as aircraft systems, medical instrumentation, military communications, and so forth.

The successful implementation of critical software variables depends at least in part on the integrity of the critical software variables. This integrity can be adversely affected if an error should occur in either the software or hardware involved in the calculation and storage processes of the critical software variables. For example, if the RAM locations used to store a critical software variable become corrupted for any reason, the system using these critical software variables could take an incorrect action, with generally undesirable consequences. Similarly, if the hardware (e.g. ROM and/or ALU) for calculating a critical software variable includes an undetected error, the integrity of the critical software variable may be compromised and the system performance may be degraded accordingly.

It is therefore generally desirable to ensure the integrity of a critical software variable via some type of verification process before the implementation of a program that utilizes the critical software variable. Accordingly, it is desirable to provide a method and apparatus for efficiently and effectively ensuring the integrity of critical software variables stored in a system memory. In addition, it is desirable to provide a method and apparatus for ensuring the integrity of critical software variables by detecting "hard" faults that occur repetitively over multiple software test loops. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

Methods and systems are provided for ensuring the integrity of a software variable stored in a memory, typically a RAM. In one embodiment, the method includes the broad steps of verifying a hardware environment used to calculate the software variable, calculating two separate copies of the variable using the verified hardware, storing the two copies in separate verified portion of the memory, and then retrieving and comparing the two separately-stored copies of the variable prior to using the data.

In another embodiment, an apparatus for ensuring the integrity of a software variable stored in memory suitably includes a processor coupled to an ALU, a RAM, and a ROM. The apparatus is configured to verify the integrity of the hardware portions of the processor, ALU, RAM and ROM that will be used to calculate and store the software variable. The software variable is calculated using only the verified hardware, and a dual store software variable is also calculated using a different portion of the verified hardware. In one embodiment, the dual store variable is a twos complement of the original variable. The calculated variables are stored in separate verified locations in RAM, and compared with each other over multiple software loops to verify the calculating and storing software.

BRIEF DESCRIPTION OF THE DRAWINGS

The present invention will hereinafter be described in conjunction with the following drawing figures, wherein like numerals denote like elements.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Critical software variables can be used in a wide range of applications, as noted above in the Background section. One exemplary application involves the use of critical software variables in the control systems of a typical modern automobile, where one or more processors may be used to manage various automotive functions, such as throttle control, fuel injection, ignition timing, braking, and other functions.

Figure 1:
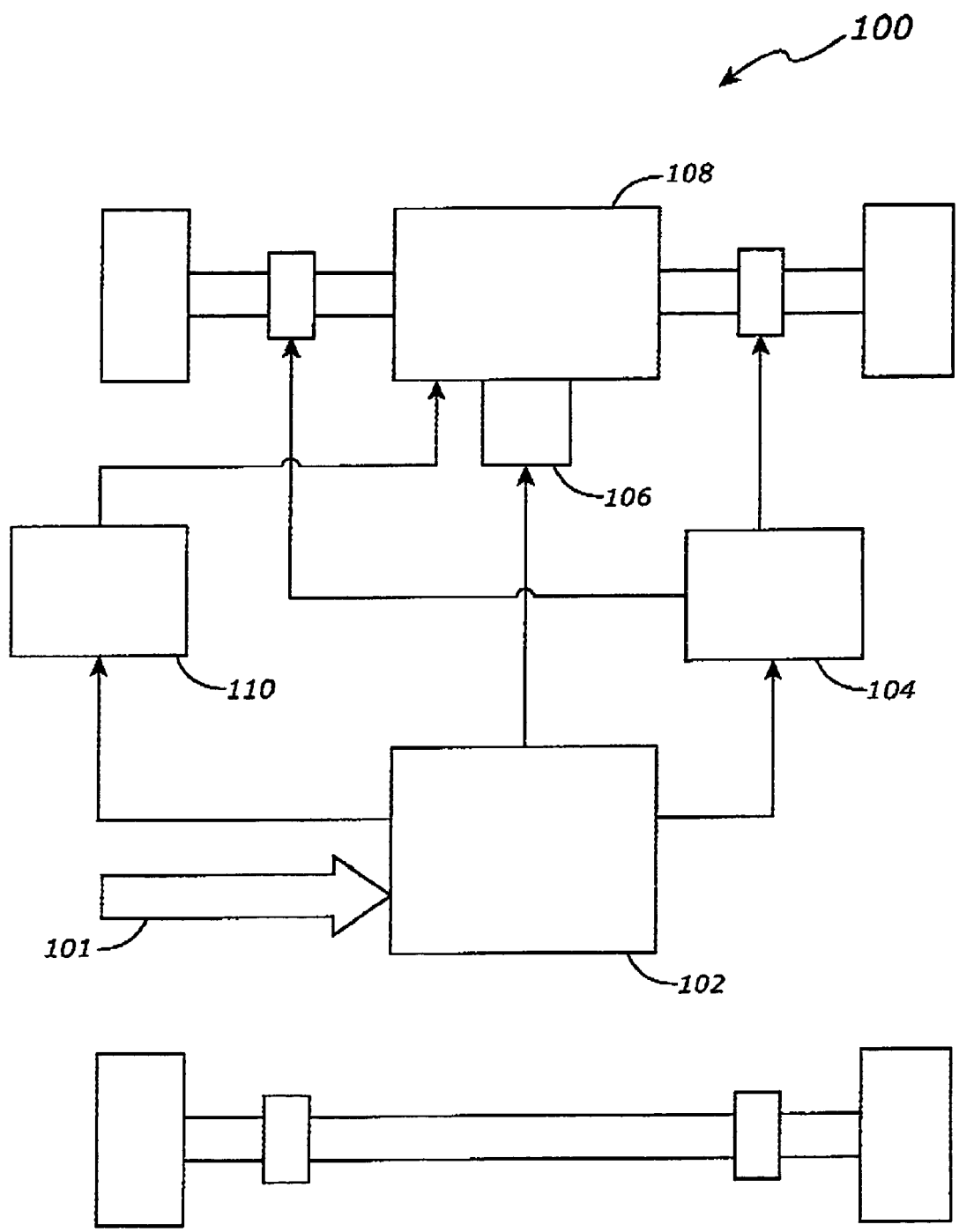
FIG. 1 depicts a simplified control configuration for a vehicle.

A simplified block diagram of a typical automotive control configuration is shown in FIG. 1. In this illustrative example, a vehicle control system 100 includes a control module 102, which typically houses a processor and associated memory (not shown). Control module 102 typically receives a number of signal inputs 101 from various sensors within the subject automobile, which provide information representing, for example, vehicle speed, engine coolant, air intake temperature, exhaust gas temperature, oil temperature, and other parameters related to vehicle performance.

Based on these sensor inputs 101, as well as other factors, control algorithms may be generated by a processor in control module 102. The control algorithms are typically used to manage the operation of, for example, a braking system 104, a fuel injection system 106 for an engine 108, a throttle control system 110 or the like within engine 108. In similar fashion, control module 102 may be further configured to manage other systems within the vehicle. Similar concepts may be used in industrial, medical and other commercial settings.

The control algorithms referred to in this example may be in part dependent on the use of critical software variables in their implementation. As such, the successful operation of the systems controlled by these algorithms will generally be dependent on the integrity of the relevant critical software variables.

Various software strategies can be used to ensure the integrity of critical software variables. In general, these strategies are based on the particular failure mode that caused a corruption. For example, one common failure mode can be attributed to an incorrectly operating arithmetic logic unit (ALU), which is typically used in the calculation of the critical software variables. Other common failure modes that can compromise the integrity of critical software variables may be attributed to data storage faults in the RAM, or to some type of hardware corruption in an associated read only memory (ROM). Moreover, the RAM and ROM failure modes can affect the integrity of both the calculation and the subsequent storage of the critical software variables. Therefore, it is typically desirable to test a system ALU, RAM and ROM, at least, before implementation of the system critical software variables.

In order to verify the operational accuracy of an ALU, some variation of a "seed and key" test is generally used. In this type of test, a known input value, called the seed, is typically manipulated using a series of ALU operations. These operations may include, for example, addition, multiplication, and shifting, as well as other ALU operations. The results of these test manipulations are then typically compared to corresponding keys, which represent known responses for the ALU manipulations. If the manipulated seed test result agrees with the corresponding key, the ALU "passes", and is generally considered to be working properly. Conversely, if the manipulated seed does not agree with the corresponding key, the ALU is generally considered to have "failed", and the system processor is typically configured to take remedial action.

RAM testing generally covers three types of data storage faults, known as stuck-at fault (SAF), transition fault (TF), and coupling fault (CF). A stuck-at fault is considered to occur when one or more bits of a memory location are stuck at 0 or 1, regardless of the value read or written to that memory location. A transition fault is considered to occur when a bit fails to change state when written to by its inverse value. A coupling fault is considered to occur when a write to one cell changes the value in one or more other cells.

A coupling fault can take the form of an inversion error, in that the write of a 1 to the target cell results in a 0 in the coupled cell(s). Another type of coupling fault can occur when a write to the target cell results in a change of the contents of the coupled cell to a 1 or a 0, regardless of the value written to the target cell. Other more complex forms of coupling faults depend on the initial state of both cells to determine the state of the coupled cells after a write.

An SAF and a TF can generally be detected by read/write tests to individual cells. For example, a test value can be written to a cell and the cell contents can be verified. Then, the inverse of the test value can be written to the same cell, and the contents can again be verified as the inverse of the test value. Should the procedure fail to verify the cell contents for either the test value or its inverse, that cell would be considered to have a fault.

Many variations of this type of cell test procedure exist, and are generally considered to be advantageous for detecting SAFs and TFs. However, these test procedures generally do not cover all types of CF's. For this reason, among others, different types of RAM fault tests have been developed, including a category known as "March" tests, since these tests effectively "march" through the RAM being tested. Of this group of memory fault detection schemes, the March C test has been generally shown to detect most CF's, in addition to providing essentially complete detection coverage for SAF's and TF's. It should be noted, however, that the March tests typically require writing and reading from a RAM in a sequence that may destroy the original contents of the RAM, and are generally not appropriate for periodic testing of the integrity of the RAM.

The integrity of a ROM can usually be verified through the use of a checksum test. For example, a checksum calculation can be performed on the ROM and the result compared to a stored checksum. In many cases, a 2's complement or cyclic reduction code (CRC) checksum is used. Due to the typically large size of ROM, testing large blocks of a ROM can generally be run in a background mode to avoid throughput problems, while small blocks of ROM can usually be verified in a foreground mode.

In addition to the failure modes described above (i.e., ALU, RAM, ROM), other types of faults may also occur. For example, a software code error may cause a write to the wrong storage location, thereby corrupting the data at that storage location. In general, this type of problem can usually be prevented by extensive system testing and verification, but may still occur during special operating conditions that utilize infrequently exercised code.

One technique for detecting software code errors involves the use of dual stores of critical software variables. Typically, the critical software variables are stored twice when calculated, and are checked for agreement before being used in critical situations. The redundant stored value is often a two's complement of the first stored variable, since verification can usually be made by simply adding the dual stored variables for an expected outcome of zero.

Another technique for verifying the integrity of critical software variables typically involves dual calculations of the critical software variables using two distinct software paths. This technique is generally referred to as "dual path" software. The answers calculated by the two software paths should be in essential agreement before a critical software variable is implemented. However, the dual path software technique generally requires the use of duplicate processor throughput resources, including the duplication of memory capability. Not only does the dual path software technique place an extra burden on a system's resources, but it may also need careful coordination and management of the two software paths for proper verification of results. Moreover, the dual path software technique may not detect faults that affect both paths similarly, as in the case of an ALU fault where a single ALU is common to both paths.

One variation of the dual path software technique may use a simplified version of the primary path as the dual path. This approach generally requires less system resources, but may also have the disadvantage that the two answers may not agree. While a fault decision process may be added to allow an error threshold between the two answers, the process may still be subject to missed detections and false alarms. This technique also generally requires two separate software paths, with their associated management problems, as noted above.

Other variations of the dual path software technique may include the calculation of the second path in two's complement math, in order to be less sensitive to ALU problems. The two paths can also be coded and maintained by separate coders to avoid software code errors. In addition, the two paths may be implemented on individual processors with different compilers to avoid common path errors due to coding, compilers, ALU, or memory. These variations, however, may prove difficult to implement because of the typical need for dual path coordination and management.

The integrity of critical software variables can be adversely affected by corruption of the hardware or software used in the calculation and storage of the critical software variables. In order to ensure that the critical software variables are not corrupted, a series of verification tests can be performed to demonstrate the integrity of the critical software variables. An exemplary embodiment of verification testing will be described below, as might be used in the automotive example of FIG. 1.

Figure 2:
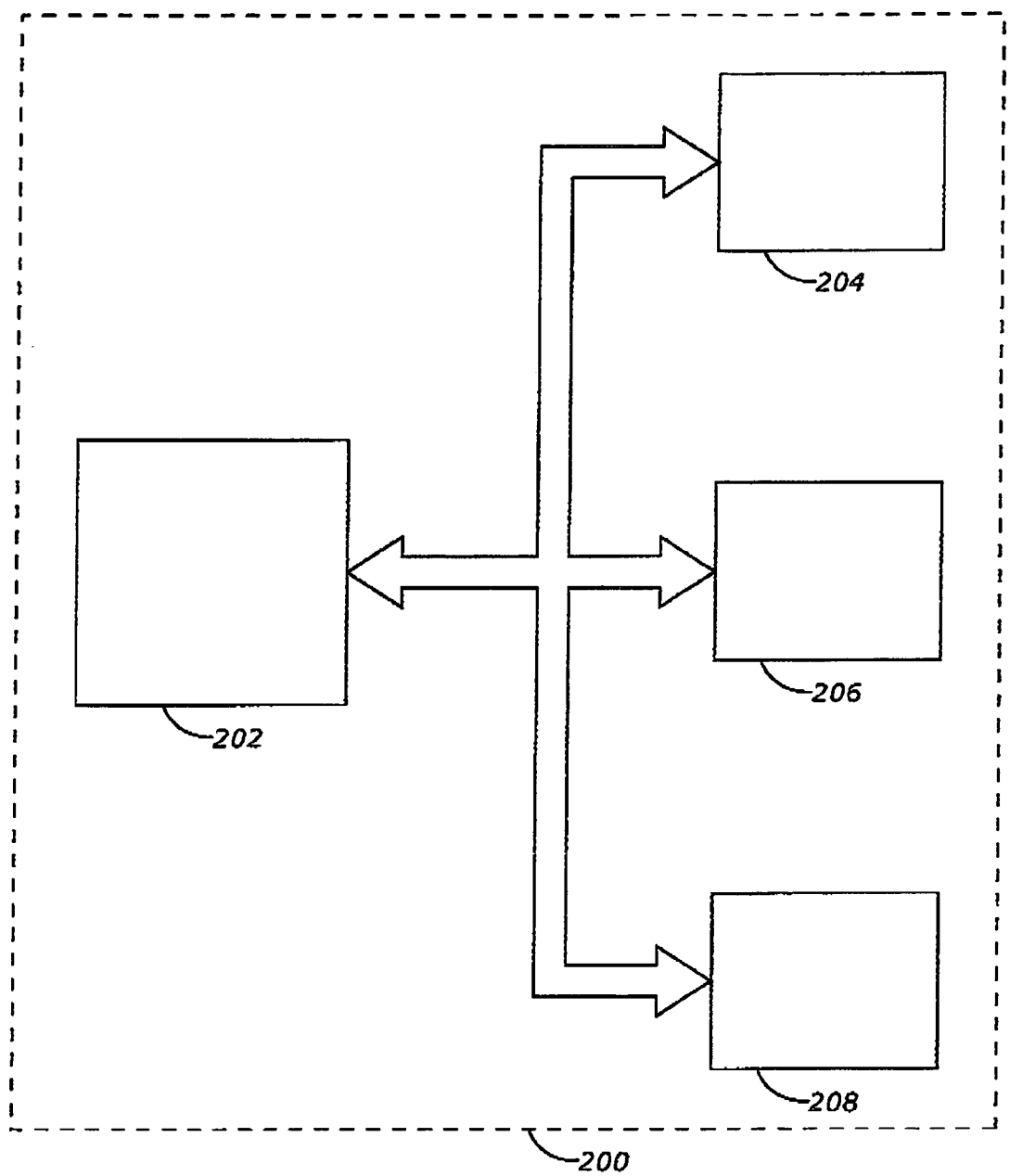
FIG. 2 represents a simplified block diagram of an exemplary control module.

An exemplary control module 200 is shown in FIG. 2, configured to function in a manner similar to that of control module 102 in FIG. 1. Referring now to FIG. 2, control module 200 typically includes a processor 202 suitably coupled to a RAM 204, an ALU 206, and a ROM 208. For clarity in describing the operation of this exemplary embodiment, it is assumed that control module 200 typically calculates a critical software variable in conjunction with RAM 204, ALU 206 and ROM 208. Processor 202 typically stores the calculated critical software variable in RAM 204 for subsequent use in implementing a control algorithm. Therefore, the integrity of the stored critical software variable in the example of FIG. 2 appropriately depends at least on the integrity of the registers used in the calculation and storage process, as well as on the integrity of the software code used to manipulate the critical software variable.

Figure 3:
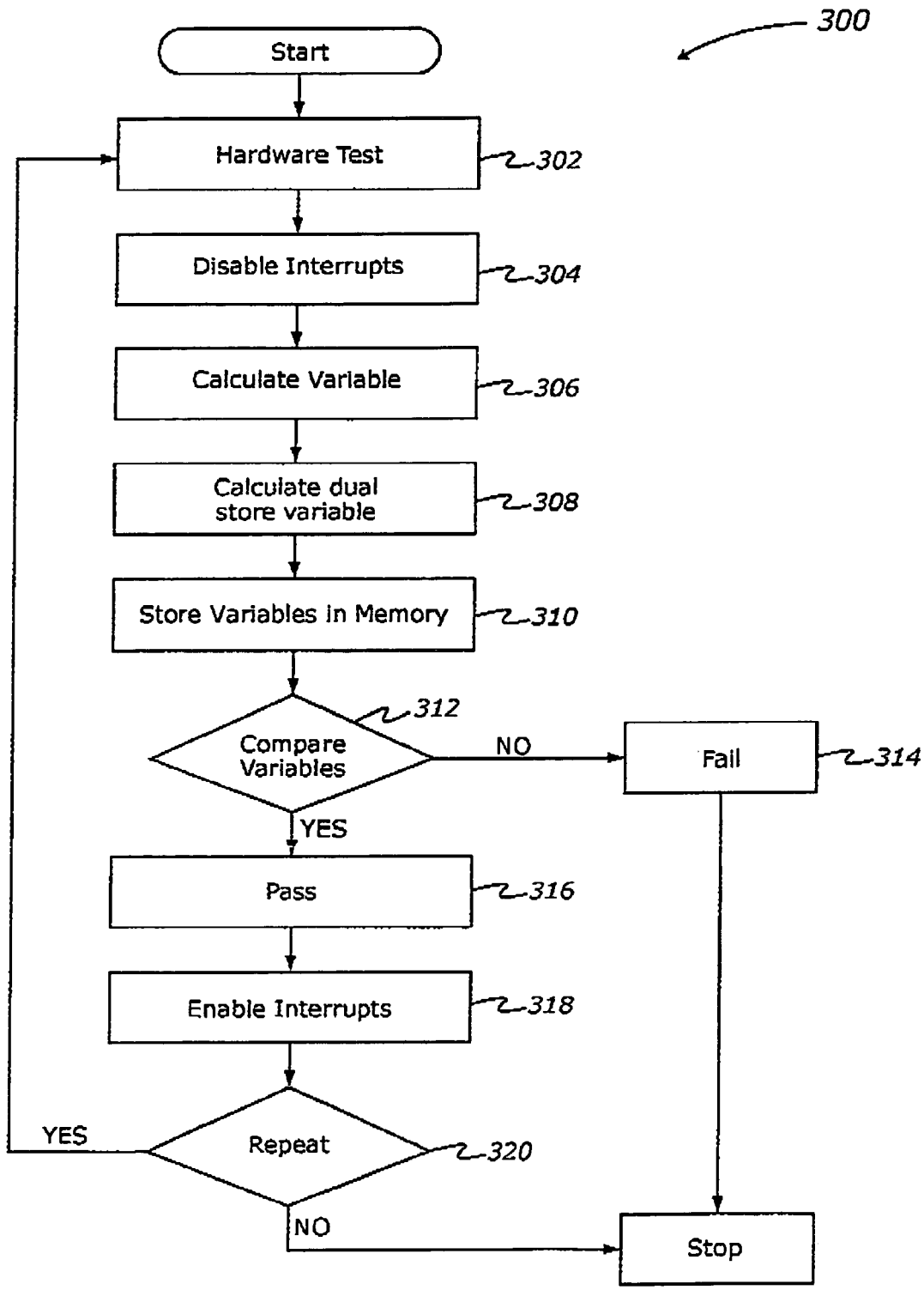
FIG. 3 illustrates a flow chart for an exemplary test procedure.

An exemplary embodiment of a verification test procedure 300, as illustrated in the flow diagram in FIG. 3, is configured to verify the integrity of the aforementioned elements (processor 202, RAM 204, ALU 206, ROM 208) of control module 200, with respect to both the hardware and software involved in a typical calculation and storage process of a critical software variable.

Referring now to FIGS. 2 and 3, the exemplary verification test procedure 300 generally starts with a comprehensive test 302 of the specific hardware components of control module 200 which are to be used for calculating and storing a critical software variable. Test 302 will be later described in detail in conjunction with FIG. 4.

After successful completion of test 302, processor 202 optionally disables the system interrupt function in step 304 to avoid a possible disruption of the verification test 300 process. Alternatively, interrupts may be disabled prior to test 302, or at any other point during procedure 300.

In step 306, a first critical software variable is generally calculated by processor 202, in conjunction with RAM 204, ALU 206 and ROM 208, using only those registers previously verified by test 302.

In step 308, a second, or dual store, critical software variable is generally calculated by processor 202, using only registers previously verified by test 302, but different from the registers used for the calculation in step 306. The dual store critical software variable is generally different from the first software variable, and may be calculated to be a two's complement of the first software variable.

In step 310, processor 202 typically stores the first and second critical software variables in previously verified locations in memory 204.

In step 312, a comparison test is generally implemented by processor 202 to verify the accuracy of the first critical software variable, with respect to the second critical software variable. The dual store variables may be verified at any time, including just prior to use by a program or algorithm, to detect corruption from storage in memory 204. If the comparison test in step 312 fails (step 314), the verification test is stopped, and processor 202 is generally configured to take remedial action. If the test in step 312 is successful (step 316), the interrupt function is generally enabled (step 318) and the test cycle is either repeated (step 320) or stopped. In an exemplary embodiment of the disclosed test 300, at least two test loops (300) are completed in order to detect repeatable failures, and to better ensure the integrity of the critical software variables.

Figure 4:
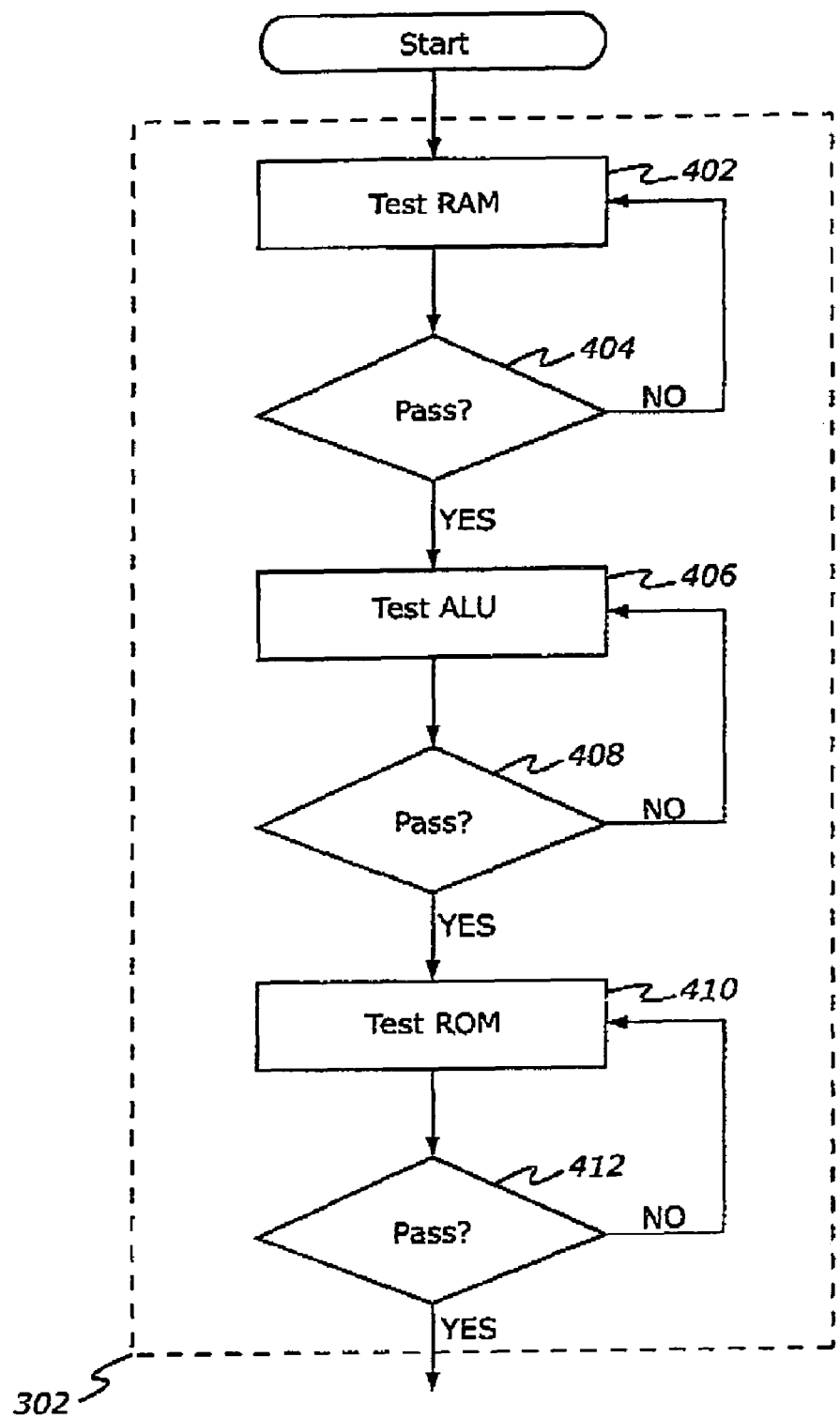
FIG. 4 illustrates an exemplary flow chart detail for a portion of the flow chart of FIG. 3.

The detailed structure of the hardware test 302 in FIG. 3 is depicted in the exemplary flow diagram of FIG. 4. Referring now to FIGS. 2, 3, and 4, the first step of hardware test 302 is generally the testing of RAM 204. As previously described in the Background section, RAM tests are typically designed to detect three failure modes: Stuck-At Fault (SAF), Transition Fault (TF) and Coupling Fault (CF). In an exemplary embodiment, a "March C" test is generally performed on all storage locations to be written during the critical software variable calculation and storage process. For exemplary multiple loop testing, the direction of the March C test is generally changed for each loop. A reference source for detailed information on March C testing, and on March tests in general, is the publication "Testing Semiconductor Memories: Theory and Practice", by Van de Goor, A. J., ComTex Publishing, The Netherlands (1999).

If RAM test 402 is successful (step 404), a seed and key test 406 is typically performed on ALU 206. As previously described in the Background section, a known input value (seed) is manipulated through a series of ALU functions, and the results are compared to known responses, or keys. In an exemplary embodiment, the seed and key test is generally designed to give comprehensive detection coverage for any ALU operation performed while calculating a critical software variable.

An incorrectly operating ALU 206, moreover, may also cause an incorrect remedial action by processor 202. In another exemplary embodiment, the seed and key test may incorporate a second "watchdog" processor (not shown). In this exemplary embodiment, the seed is typically communicated from the watchdog processor to the processor 202, where the seed manipulation takes place. The result is then communicated back to the watchdog processor for verification against the key. If the result and the key disagree, the watchdog processor can be used to take remedial action.

If ALU test 406 is successful (step 408), a checksum test 410 is generally performed on ROM 208. An exemplary embodiment generally performs the ROM checksum test only for those locations in ROM 208 that are used in the calculation of the critical software variable.

If ROM test 410 is successful (step 412), hardware verification test 302 is completed, and verification test procedure 300 continues to the interrupt disable step 304, as shown in FIG. 3. The calculation and storage of critical variables (steps 306–310) can then be implemented with the assurance that the hardware used in the process has been previously verified (step 302). The relevant software is then verified by means of the dual store comparison technique (step 312), as described above.

Various equivalent embodiments may provide additional testing and/or features as appropriate. For example, if any of tests 402, 406, 410 or the like fail more than one time, alternate processing may be provided. If any component fails to pass a test after two or more attempts, for example, that component may be isolated, shut down, bypassed or dealt with in any other appropriate manner.

Accordingly, the shortcomings of the prior art have been overcome by providing a comprehensive and efficient verification procedure for ensuring the integrity of critical software variables. An exemplary procedure verifies both the hardware and software that is used to calculate and store the critical software variables before their implementation in a control algorithm. The exemplary dual store technique uses a single software path for the calculations of the critical software variables, in contrast to the two software paths used in the prior art dual path software technique described above. Moreover, only those faults that occur repetitively over multiple software test loops are detected, confirming the existence of a hard fault.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. Various changes may be made in the function and arrangement of elements described in an exemplary embodiment without departing from the scope of the invention as set forth in the appended claims.

What is claimed is:

1. A method of ensuring the integrity of a software variable stored in a memory, comprising the steps of:
    verifying the integrity of a hardware environment for the software variable, wherein the hardware environment comprises a processor, a plurality of registers, and a plurality of storage locations in said memory;
    calculating a first copy of said software variable using said processor and a first set of said plurality of registers;
    calculating a second copy of said software variable different from said first copy of said software variable using said processor and a second set of said plurality of registers;
    storing said first said software variable in a first portion of said verified plurality of storage locations in said memory;
    storing said second said software variable in a second portion of said verified plurality of storage locations in said memory; and
    comparing said first copy of said software variable from said first portion of said storage locations with said second copy of said software variable from said second portion of said storage locations to thereby ensure the integrity of said software variable stored in said memory.

2. The method of claim 1 further comprising the step of disabling interrupts to said processor prior to said step of calculating said first said software variable.

3. The method of claim 2 further comprising the step of enabling said interrupts after said step of storing said second said software variable.

4. The method of claim 1 wherein said second copy of said software variable is a twos complement of said first copy of said software variable.

5. The method of claim 1 wherein said step of verifying the integrity of a plurality of storage locations in said memory is based at least upon a March C test.

6. The method of claim 5 wherein said March C test is performed in more than one direction.

7. The method of claim 1 wherein said step of verifying the operational integrity of said processor is based at least upon a seed and key test.

8. The method of claim 7 wherein said step of verifying the operational integrity of said processor is based at least upon the use of a redundant processor.

9. The method of claim 1 wherein said step of verifying the integrity of a plurality of registers is based at least upon a checksum test.

10. An apparatus for calculating and storing a software variable in a memory, comprising:
    a processor coupled to said memory; and
    a plurality of registers coupled to said processor, wherein said processor is configured to verify the integrity of said memory and said plurality of registers, and said processor is further configured to calculate and store said software variable in said memory after said verifying said memory and said plurality of registers; and
    wherein said processor is further configured to verify the integrity of said stored software variable over multiple software loops.

11. The apparatus of claim 10 wherein said processor comprises an Arithmetic Logic Unit (ALU).

12. The apparatus of claim 10 wherein said memory is configured as a Random Access Memory (RAM).

13. The apparatus of claim 10 wherein said plurality of registers are configured as a Read Only Memory (ROM).

14. A method of ensuring the integrity of a calculated software variable stored in a memory, comprising the steps of:
    verifying the integrity of hardware used to calculate and store said calculated software variable, wherein said hardware comprises said memory;
    computing at least two copies of said calculated software variable;
    storing the at least two copies of said calculated software variable in separate portions of said memory; and
    testing the integrity of said calculated software variable over a plurality of software test loops, wherein the testing step comprises comparing the at least two copies of said calculated software variable to each other.

15. The method of claim 14 wherein said verifying step comprises testing at least those portions of a processor and said memory involved in the calculation and storage of said calculated software variable.

16. The method of claim 15 wherein the verifying step further comprises testing a register used in computing the at least two copies of said calculated software variable.

17. An apparatus for ensuring the integrity of a software variable, comprising:
   means for verifying the integrity of hardware used to calculate and store said calculated software variable, wherein said hardware comprises said memory;
   means for computing at least two copies of said calculated software variable;
   means for storing the at least two copies of said calculated software variable in separate portions of said memory; and
   means for testing the integrity of said calculated software variable over a plurality of software test loops, wherein the testing means comprises means for comparing the at least two copies of said calculated software variable to each other.

18. An apparatus for ensuring the integrity of a software variable stored in a memory, comprising:
   a first module for verifying the integrity of hardware used to calculate and store said calculated software variable, wherein said hardware comprises said memory;
   a second module for computing at least two copies of said calculated software variable;
   a third module for storing the at least two copies of said calculated software variable in separate portions of said memory; and
   a fourth module for testing the integrity of said calculated software variable over a plurality of software test loops, wherein the testing means comprises means for comparing the at least two copies of said calculated software variable to each other.

19. A digital storage medium having computer-executable instructions stored thereon, the instructions comprising:
   a first module for verifying the integrity of hardware used to calculate and store said calculated software variable, wherein said hardware comprises said memory;
   a second module for computing at least two copies of said calculated software variable;
   a third module for storing the at least two copies of said calculated software variable in separate portions of said memory; and
   a fourth module for testing the integrity of said calculated software variable over a plurality of software test loops, wherein the testing means comprises means for comparing the at least two copies of said calculated software variable to each other.

20. A vehicle having an electronic control module having a processor and a memory configured to store computer-executable instructions for the processor, wherein the instructions comprise:
   a verifying module configured to verify the integrity of calculating and storing hardware;
   a calculating module configured to calculate a first software variable using said verified calculating and storing hardware, said calculating module further configured to calculate a second software variable different from said first software variable using said verified calculating and storing hardware;
   a storing module configured to store said first and second software variables in first and second portions, respectively, of said verified calculating and storing hardware; and
   a comparing module configured to compare said first software variable with said second software variable for mutual verification over a plurality of software loops.

* * * * *